US011731679B2

(12) United States Patent
Ondrasik, Jr. et al.

(10) Patent No.: US 11,731,679 B2
(45) Date of Patent: Aug. 22, 2023

(54) TOTE CART WITH CANTILEVERED SHELVES

(71) Applicant: THE ONDRASIK FAMILY TRUST DATED Nov. 3, 1999, Commerce, CA (US)

(72) Inventors: V. John Ondrasik, Jr., Granada Hills, CA (US); V. John Ondrasik, IV, Westlake Village, CA (US)

(73) Assignee: THE ONDRASIK FAMILY, Commerce, CA (US), TRUST DATED Nov. 3, 1999

( * ) Notice: Subject to any disclaimer, the term of this patent is extended or adjusted under 35 U.S.C. 154(b) by 0 days.

(21) Appl. No.: 17/539,418

(22) Filed: Dec. 1, 2021

(65) Prior Publication Data

US 2022/0185352 A1 Jun. 16, 2022

Related U.S. Application Data

(60) Provisional application No. 63/124,608, filed on Dec. 11, 2020.

(51) Int. Cl.
*B62B 3/10* (2006.01)
*B62B 3/02* (2006.01)
*B62B 3/00* (2006.01)

(52) U.S. Cl.
CPC ............ *B62B 3/10* (2013.01); *B62B 3/002* (2013.01); *B62B 3/006* (2013.01); *B62B 3/02* (2013.01)

(58) Field of Classification Search
CPC ........... B62B 3/10; B62B 3/002; B62B 3/006; B62B 3/02; B62B 3/1468; B62B 3/1476; B62B 3/005; B62B 2205/32; B62B 3/184; A47B 57/045; A47B 57/04; A47B 57/00
See application file for complete search history.

(56) References Cited

U.S. PATENT DOCUMENTS

| 4,037,851 A | * | 7/1977 | Romero | B62B 3/02 |
| | | | | 280/79.3 |
| 5,816,419 A | * | 10/1998 | Lamson | A47B 57/045 |
| | | | | 248/242 |
| 6,749,208 B2 | * | 6/2004 | Orozco | B62B 3/14 |
| | | | | 280/47.35 |

(Continued)

FOREIGN PATENT DOCUMENTS

| DE | 19504771 A1 * | 8/1995 | ............. A47L 13/51 |
| DE | 102016210145 A1 * | 12/2017 | ............... B62B 3/02 |

(Continued)

*Primary Examiner* — James A Shriver, II
*Assistant Examiner* — Ian Bryce Shelton
(74) *Attorney, Agent, or Firm* — David R. Heckadon; Gordon Rees Scully Mansukhani LLP

(57) ABSTRACT

A tote cart, having: a base; a plurality of wheels positioned underneath the base; a pair of upwardly extending supports mounted to the base; and a plurality of cantilevered shelves, wherein each cantilevered shelf is configured to be mounted onto the pair of upwardly extending supports. The cantilevered shelves are removable and re-positionable to different heights on the upwardly extending supports and have a perimeter member spanning around the front and sides of the shelf, and a moveable shelf that can be moved from a first position parallel to the perimeter member to second position at a dropped down angle to the perimeter member.

13 Claims, 8 Drawing Sheets

(56) References Cited

U.S. PATENT DOCUMENTS

| | | | | |
|---|---|---|---|---|
| 6,948,900 B1* | 9/2005 | Neuman | ............... | B65G 1/023 211/126.9 |
| 8,267,261 B2* | 9/2012 | Vanderhoek | ........... | A47F 5/0081 211/187 |
| 9,936,825 B1* | 4/2018 | Lindblom | ............. | A47F 5/0087 |
| 2003/0196975 A1* | 10/2003 | Murray | ................... | A47F 5/137 211/126.2 |
| 2003/0205876 A1* | 11/2003 | Orozco | ..................... | B62B 3/14 280/79.3 |
| 2005/0012286 A1* | 1/2005 | Woodrow | ............... | B62B 3/148 280/47.35 |
| 2006/0059934 A1* | 3/2006 | Howington | ........... | A47B 57/045 62/251 |
| 2008/0007019 A1* | 1/2008 | Sparkowski | ............ | B62B 3/006 280/79.3 |
| 2008/0143069 A1* | 6/2008 | Richards | ................... | B62B 3/02 280/47.35 |
| 2009/0266775 A1* | 10/2009 | Vanderhoek | .......... | A47F 5/0093 211/49.1 |
| 2009/0309322 A1* | 12/2009 | Selvig | ................... | B62B 3/1476 280/33.996 |
| 2016/0029786 A1* | 2/2016 | Davis | ..................... | A47B 91/00 211/208 |
| 2017/0190346 A1* | 7/2017 | Sainato | .................. | B62B 3/005 |
| 2018/0008039 A1* | 1/2018 | Colelli | ................... | A47F 5/005 |
| 2018/0244293 A1* | 8/2018 | Murray | ................... | A47F 13/00 |
| 2019/0272399 A1* | 9/2019 | Iizaka | ................... | B62B 5/0096 |
| 2020/0187675 A1* | 6/2020 | Obitts | ................... | A47F 5/0018 |

FOREIGN PATENT DOCUMENTS

| | | | | |
|---|---|---|---|---|
| GB | 2326815 A | * | 1/1999 | ............ A47B 96/02 |
| WO | WO-2018067861 A1 | * | 4/2018 | |

* cited by examiner

TOTE CART WITH CANTILEVERED SHELVES

RELATED APPLICATION

The present application claims priority to U.S. Provisional Patent application 63/124,608, filed Dec. 11, 2020, of same title, the entire disclosure of which is incorporated herein by reference in its entirety.

TECHNICAL FIELD

The present invention relates to wireframe tote carts and organizing carts.

SUMMARY OF THE INVENTION

The present invention provides a tote cart, comprising: a base; a plurality of wheels positioned underneath the base; a pair of upwardly extending supports mounted to the base; and a plurality of cantilevered shelves, wherein each cantilevered shelf is configured to be mounted onto the pair of upwardly extending supports.

A first advantage of this system is that the cantilevered shelves are removable and re-positionable to different heights on the upwardly extending supports. As such, limitless shelving configurations are possible.

The advantage of the individual shelves being cantilevered is that the totes can conveniently be loaded onto the shelves from all angles. This is because there are no end or side vertical bars blocking the totes' access to the shelves. As such, a user can easily load totes onto the shelves from the ends, or sides of the tote carts. A user can also load totes onto the shelves diagonally.

In preferred aspects, one side (e.g.: one half) of the base is slightly narrower than the other side. This advantageously permits horizontal nesting of a plurality of tote carts (in a way that storage space for the carts is used most efficiently).

In addition, the cantilevered shelves extending from one side of the upwardly extending supports are preferably positioned at different vertical heights from the cantilevered shelves extending from the other side of the upwardly extending supports. This also facilitates horizontal nesting of a plurality of tote carts as it prevents the shelves from one tote cart from simply hitting the shelves from the next tote care when two tote carts are pushed together. The present inventors have built embodiments of the invention in which tote carts have nested together over approximately 40% of their lengths. This is because the narrow side of the base of one tote cart is received within the wide side of the base of the adjacent tote cart, and the shelves of the two adjacent carts are at different heights. As such, the shelves of adjacent tote carts overlap one another.

In preferred aspects, each of the cantilevered shelves comprise: a perimeter member spanning around the front and sides of the shelf, and a moveable shelf mounted within the perimeter member. The opposite ends of the perimeter members have fasteners for attachment to the upwardly extending supports. A variety of attachment mechanisms are possible, all keeping within the scope of the present invention. The moveable shelf can be moved from a first position parallel to the perimeter member to second position (or preferably several positions) at a dropped down angle to the perimeter member.

Totes can be conveniently placed onto the cantilevered shelves. The advantage of having one or more dropped down position(s) is that the totes can be positioned at a preferred angle where it is convenient to load or unload the contents of the totes. By having a plurality of dropped-down positions (in addition to a default horizontal position), the user can adjust the angle at which the tote is sitting on the shelf. Tilting the open top end of the totes has the advantage of making it easier for the user to reach into the tote. A user may wish to tilt totes on upper shelves, while leaving totes on lower shelves positioned horizontal. These placement decisions are all conveniently made by the user, and can be changed easily at any time.

Advantageously, when each moveable shelf is moved into one of its dropped down position(s), then the perimeter member wraps around the base of the tote to keep the tote securely on the shelf. As such, although the open top end of the tote is tilted towards the user, the tote will not simply slide off of the cantilevered shelf.

Optionally, one of the cantilevered shelves can include a basket and push handle extending therefrom for an operator to hold onto while driving the tote around. Typically, the front wheels are rotatable around vertical axes, making the tote cart steerable.

DETAILED DESCRIPTION OF THE DRAWINGS

Figure 1A:
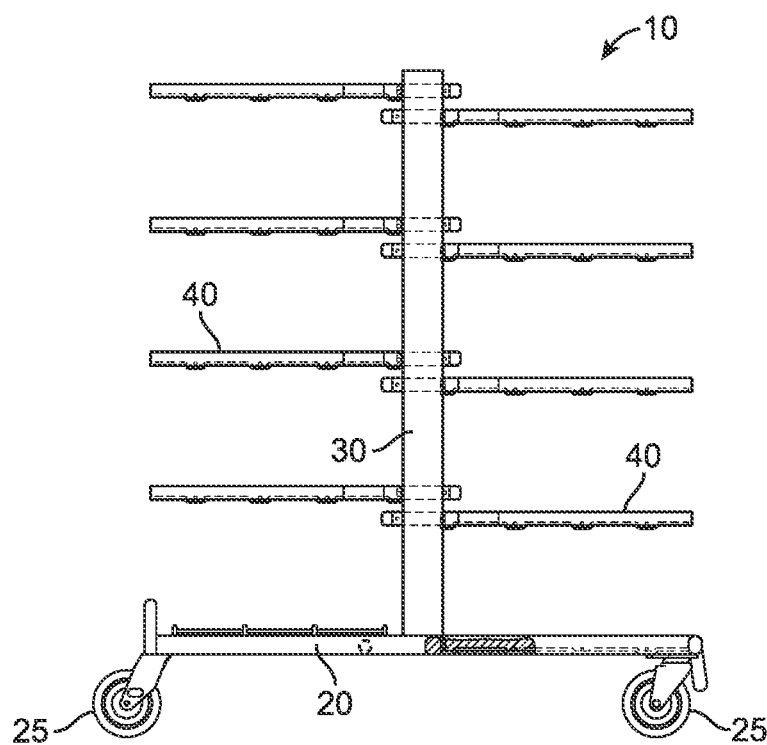
FIG. 1A illustrates a side view of the present tote cart with cantilevered shelves attached thereon.

As seen in the attached Figures, the present invention provides a tote cart 10. Tote cart 10 preferably comprises: a base 20; a plurality of wheels 25 positioned underneath base 20; a pair of upwardly extending supports 30 mounted to base 20; and a plurality of cantilevered shelves 40, wherein each cantilevered shelf 40 is configured to be mounted onto the pair of upwardly extending supports 30.

The cantilevered shelves 40 are removable and re-positionable to different heights on the upwardly extending supports 30.

Each of the pair of upwardly extending supports 30 has a plurality of holes 32 to receive fasteners on the cantilevered shelves 40 therein. It is to be understood that alternate fastening systems can be used to attach cantilevered shelves 40 to upwardly extending supports 30. Preferably, only the opposite ends of perimeter member 42 have the fasteners for attachment to the upwardly extending supports 30.

Figure 1B:
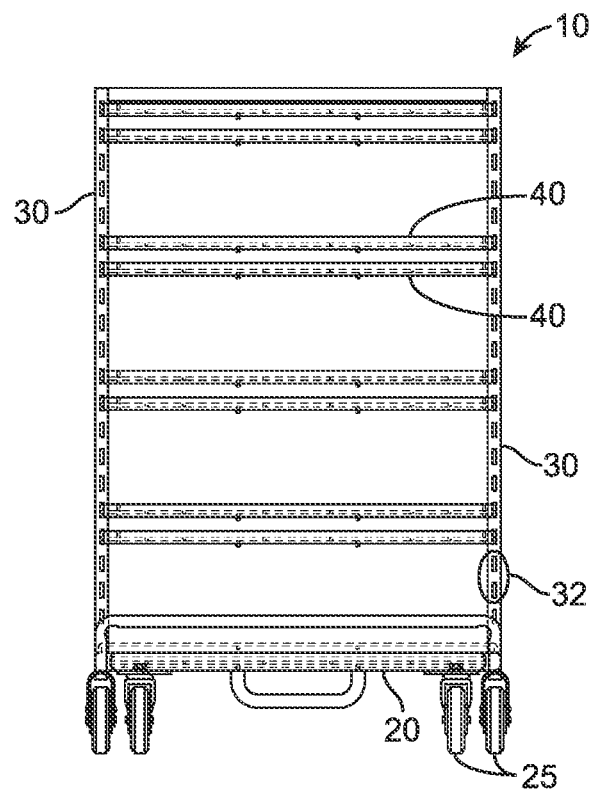
FIG. 1B illustrates an end view of the present tote cart with cantilevered shelves attached thereon.
Figure 1C:
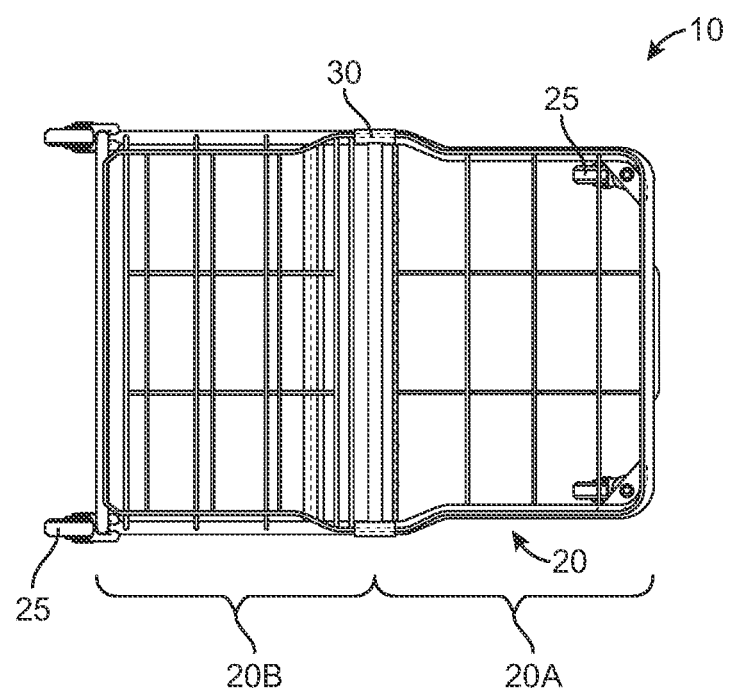
FIG. 1C illustrates a top view of the present tote cart with cantilevered shelves attached thereon.
Figure 2A:
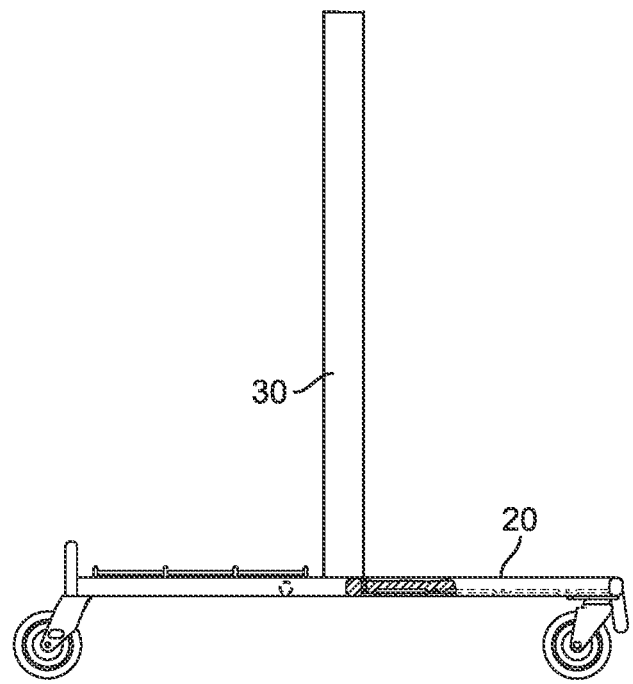
FIG. 2A illustrates a side view of the present tote cart with cantilevered shelves removed.
Figure 2B:
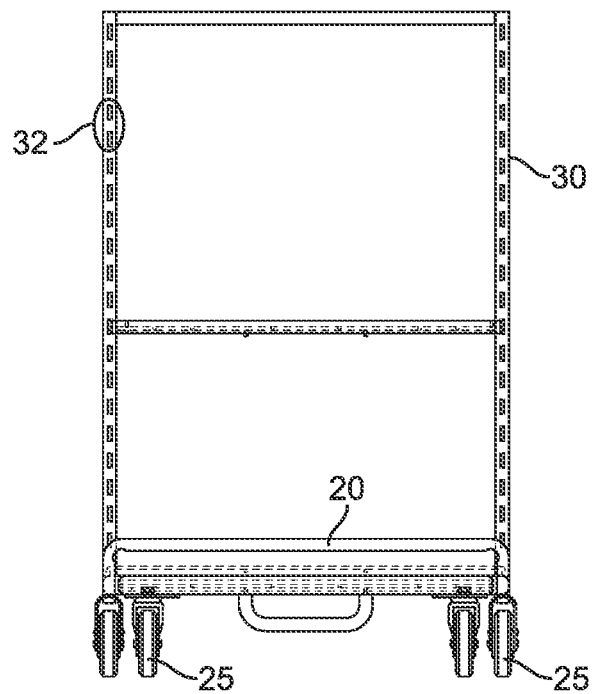
FIG. 2B illustrates an end view of the present tote cart with cantilevered shelves removed.
Figure 2C:
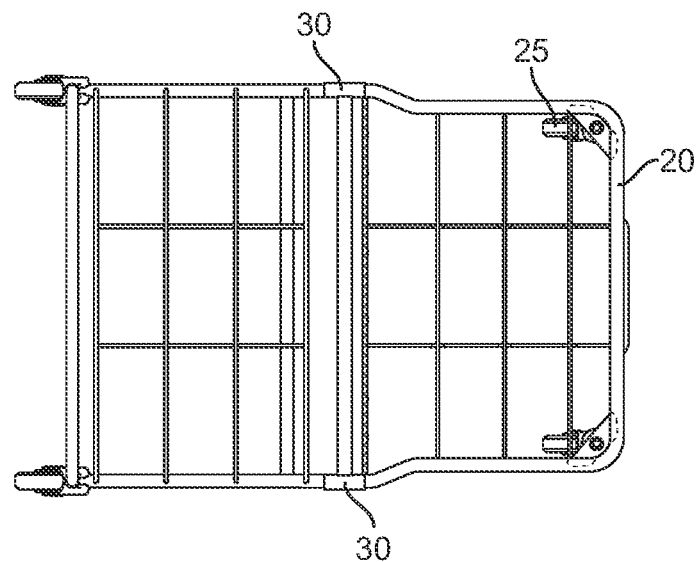
FIG. 2C illustrates a top view of the present tote cart with cantilevered shelves removed.
Figure 4A:
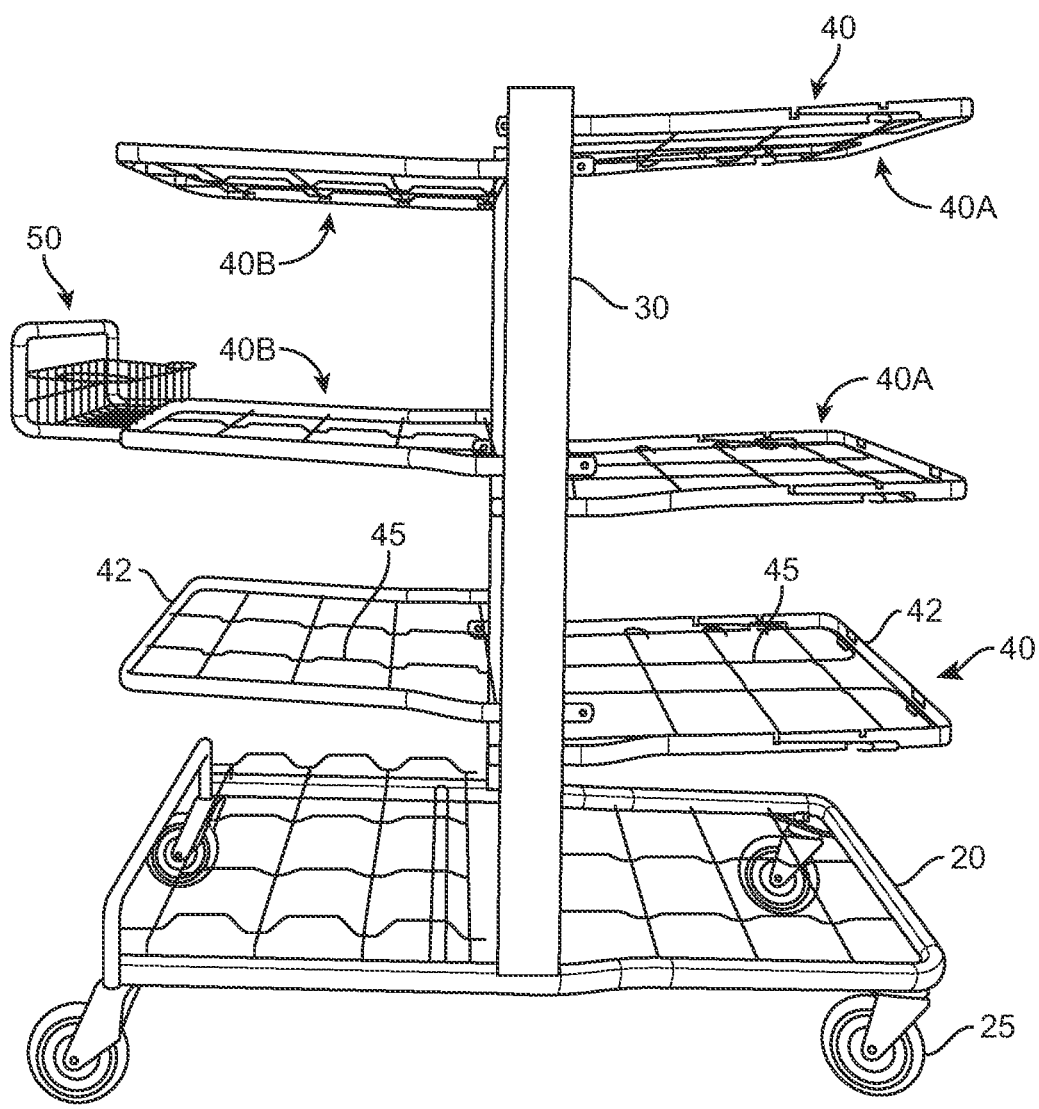
FIG. 4A is a perspective view of the present tote cart with cantilevered shelves extending from both sides.
Figure 4B:
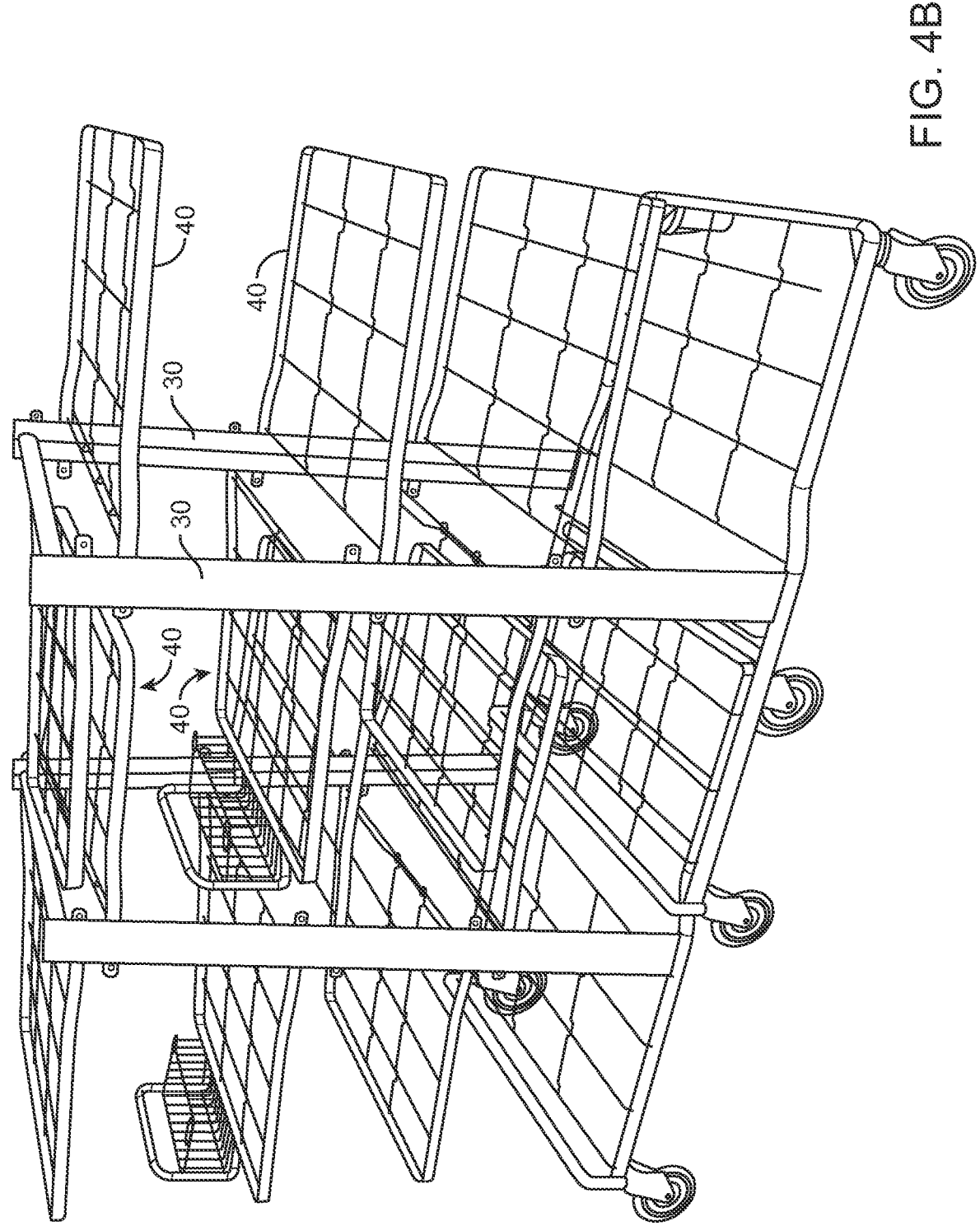
FIG. 4B is a perspective view of two tote carts nested together.

The pair of upwardly extending supports 30 are mounted at the center of opposite sides of the base 20 (such that portions 20A and 20B are equal or approximately equal as seen in the top view in FIGS. 1A to 1C). As also seen best in FIG. 1C, base 20 is narrower on one side (20A) and wider on the other side (20B) to permit horizontal nesting of a plurality of tote carts as seen in FIG. 4B (such that the front and back wheels align as shown in FIG. 1B).

Figure 5A:
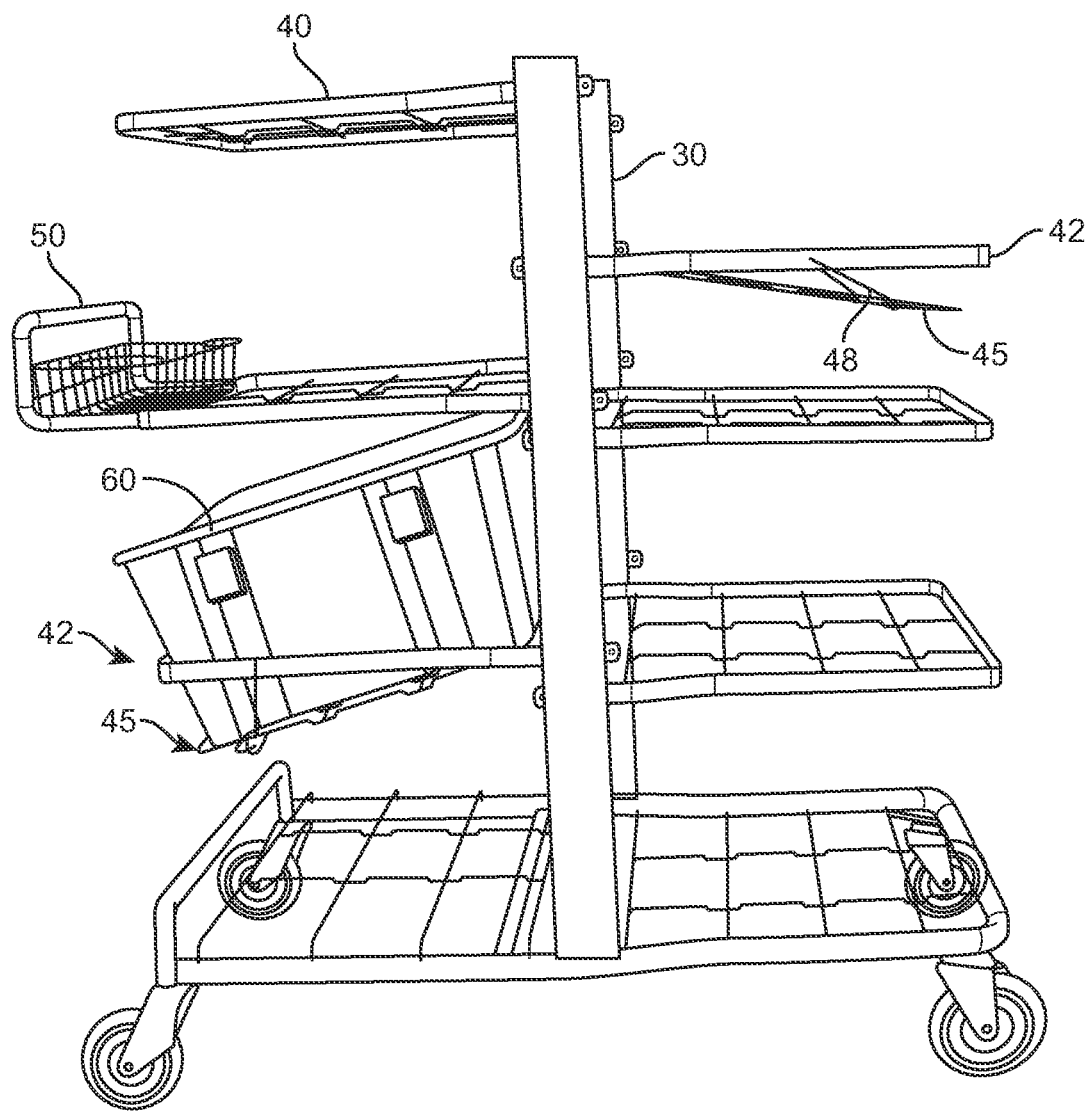
FIG. 5A is a side view of the present tote cart showing a drop-down feature of the cantilevered shelf, with the shelf dropped down to angle the tote thereon by a first amount.
Figure 5B:
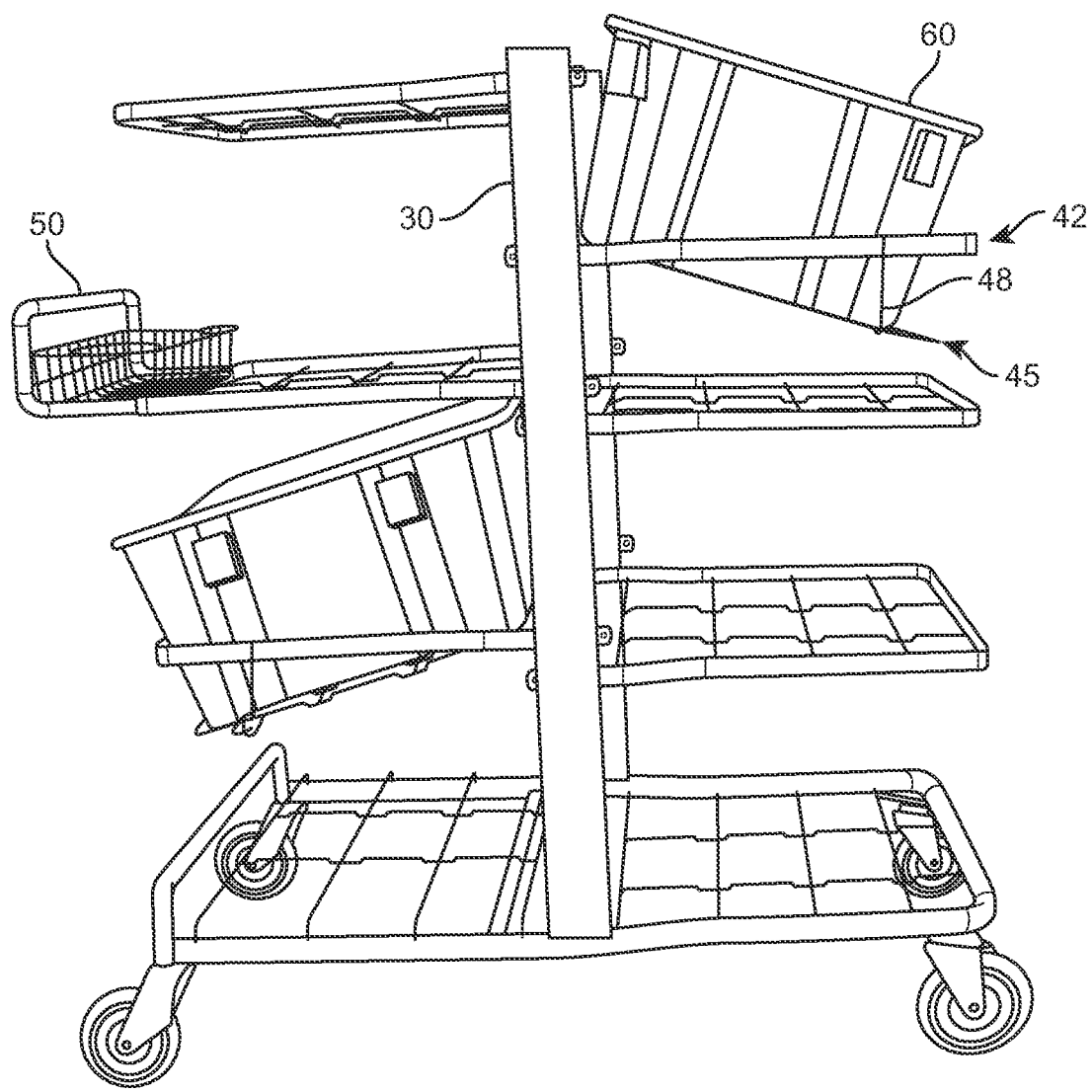
FIG. 5B is a side view of the present tote cart showing a drop-down feature of the cantilevered shelf, with the shelf dropped down to angle the tote thereon by a second amount with a tote sitting thereon.

In preferred aspects, each of the cantilevered shelves 40 comprise: a perimeter member 42 spanning around the front and sides of the shelf, and a moveable shelf 45 mounted within perimeter member 42. Preferably, the moveable shelf 45 can be moved from a first position parallel to the perimeter member (as seen in FIG. 4A) to second position or positions (as seen in FIGS. 5A and 5B) at a dropped down angle to the perimeter member 42. Specifically, moveable shelf 45 can preferably be moved to at least two different dropped down positions, with each dropped down position being at a different angle to the perimeter member 42. (See FIG. 5B where moveable shelf 45 is dropped to a larger angle and FIG. 5A where shelf 45 is dropped to a smaller angle). A fastener 48 on each of the sides of perimeter member 42 supports moveable shelf 45 in each of these two dropped down positions. Preferably, moveable shelf 45 is a wireframe shelf as shown.

An advantage of the present tote cart 10 is that its cantilevered shelves 40 can be positioned on either side of the upwardly extending supports 30. As seen in FIGS. 4A and 4B, the cantilevered shelves 40A extending from one side of the upwardly extending supports 30 can be positioned at different vertical heights from the cantilevered shelves 40B extending from the other side of the upwardly extending supports, thereby permitting horizontal nesting of a plurality of tote carts as seen in FIG. 4B. Base 20 can optionally be a wireframe base.

Figure 3:
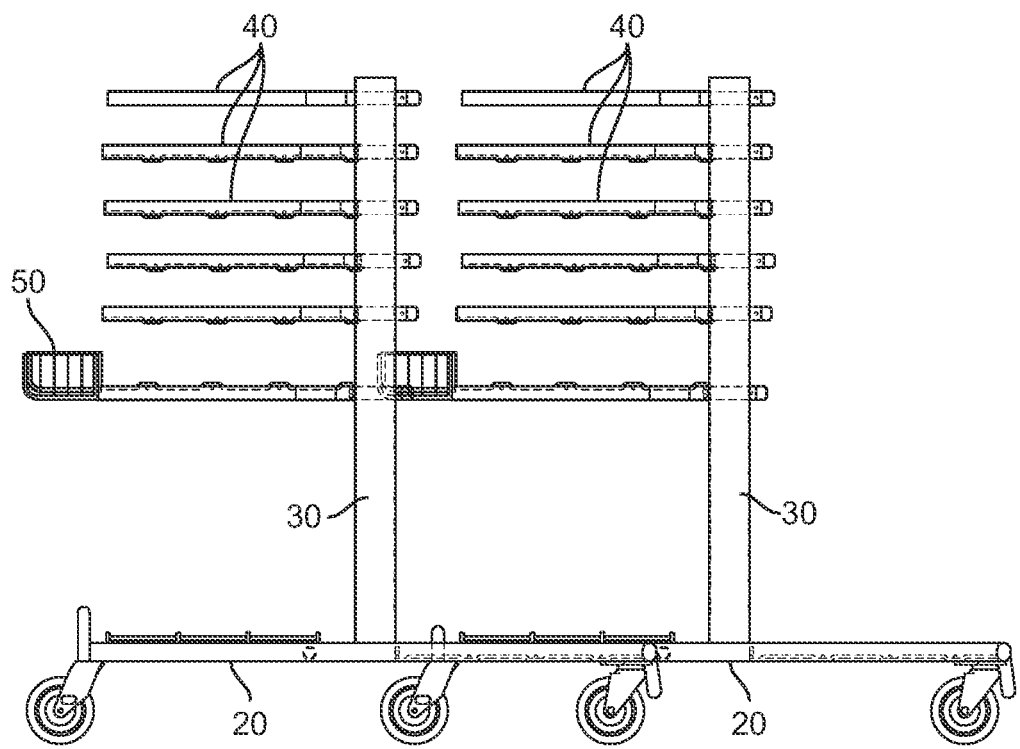
FIG. 3 is a side elevation view of a pair of the present tote carts, each having cantilevered shelves on one side, showing how two carts can be nested together.

Optionally, as seen in FIGS. 3, 4A and 5A, at least one of the cantilevered shelves 40 further comprises a basket and push handle assembly 50 extending therefrom.

As seen in FIGS. 5A and 5B, one or more totes 60 can be positioned on each of cantilevered shelves 40.

FIG. 3 shows a nesting configuration with two tote carts 10 having shelves at the same height, but the shelves 40 are only positioned on one side of the carts, such that the shelves of the two carts do not touch one another when the carts 10 are nested together. FIG. 4B shows two tote carts 10 nested together with cantilevered shelves 40 at different heights (so the shelves of adjacent carts do not touch when the carts are nested together.

What is claimed is:

1. A tote cart, comprising:
a base;
a plurality of wheels positioned underneath the base;
a pair of upwardly extending supports mounted to the base; and
a plurality of cantilevered shelves, wherein each cantilevered shelf is configured to be mounted onto the pair of upwardly extending supports, and
wherein each of the cantilevered shelves comprise:
a perimeter member spanning around a front and sides of the shelf, and
a moveable shelf mounted within the perimeter member, wherein the moveable shelf can be moved from a first position parallel to the perimeter member to second position at a dropped down angle to the perimeter member.

2. The tote cart of claim 1, wherein each of the plurality of cantilevered shelves are removable and re-positionable to different heights on the pair of upwardly extending supports.

3. The tote cart of claim 1, wherein each of the pair of upwardly extending supports has a plurality of holes to receive fasteners on the cantilevered shelves therein.

4. The tote cart of claim 1, wherein the pair of upwardly extending supports are mounted at the center of opposite sides of the base.

5. The tote cart of claim 1, wherein the base is narrower on one side to permit horizontal nesting of a plurality of tote carts.

6. The tote cart of claim 1, wherein the opposite ends of the perimeter member comprise fasteners for attachment to the upwardly extending supports.

7. The tote cart of claim 1, wherein the moveable shelf can be moved to at least two different dropped down positions, each dropped down position being at a different angle to the perimeter member.

8. The tote cart of claim 1, wherein the moveable shelf is a wireframe shelf.

9. The tote cart of claim 1, wherein each of the cantilevered shelves can be positioned on either side of the upwardly extending supports.

10. The tote cart of claim 1, wherein the cantilevered shelves extending from one side of the upwardly extending supports are positioned at different vertical heights from the cantilevered shelves extending from the other side of the upwardly extending supports, thereby permitting horizontal nesting of a plurality of tote carts.

11. The tote cart of claim 1, wherein at least one of the cantilevered shelves further comprises a basket and push handle extending therefrom.

12. The tote cart of claim 1, wherein the base is a wireframe base.

13. The tote cart of claim 1, further comprising:
a plurality of totes, wherein each tote is positioned on one of the cantilevered shelves.

* * * * *